United States Patent [19]
deVries

[11] 3,958,020
[45] May 18, 1976

[54] BACTERICIDAL WASH FOR MEAT

[75] Inventor: Egbert deVries, Kettering, Ohio

[73] Assignee: Quad Corporation, Highland Park, Ill.

[22] Filed: Jan. 16, 1975

[21] Appl. No.: 541,526

[52] U.S. Cl. .............................. 426/265; 426/264; 426/332; 426/532
[51] Int. Cl.² ............................................ A23B 4/12
[58] Field of Search .......... 426/332, 335, 327, 253, 426/254, 532, 539, 264, 265

[56] References Cited
UNITED STATES PATENTS

| | | | |
|---|---|---|---|
| 1,249,205 | 12/1917 | Rogers | 426/332 |
| 3,328,178 | 6/1967 | Alderton | 426/335 |
| 3,600,198 | 8/1971 | Gonthier et al. | 426/335 |
| 3,745,026 | 7/1973 | Hansen | 426/332 |
| 3,819,329 | 6/1974 | Kaestner et al. | 426/335 |

*Primary Examiner*—Curtis P. Ribando
*Attorney, Agent, or Firm*—Fidelman, Wolffe & Waldron

[57] ABSTRACT

A method is provided for inhibiting microbial spoilage and discoloration of edible meat comprising contacting the external surfaces of said meat with an aqueous hypochlorous acid solution, the solution being at a pH related to the elapsed time after the slaughter of the meat animal so that the growth of salmonella organisms is inhibited.

18 Claims, 1 Drawing Figure

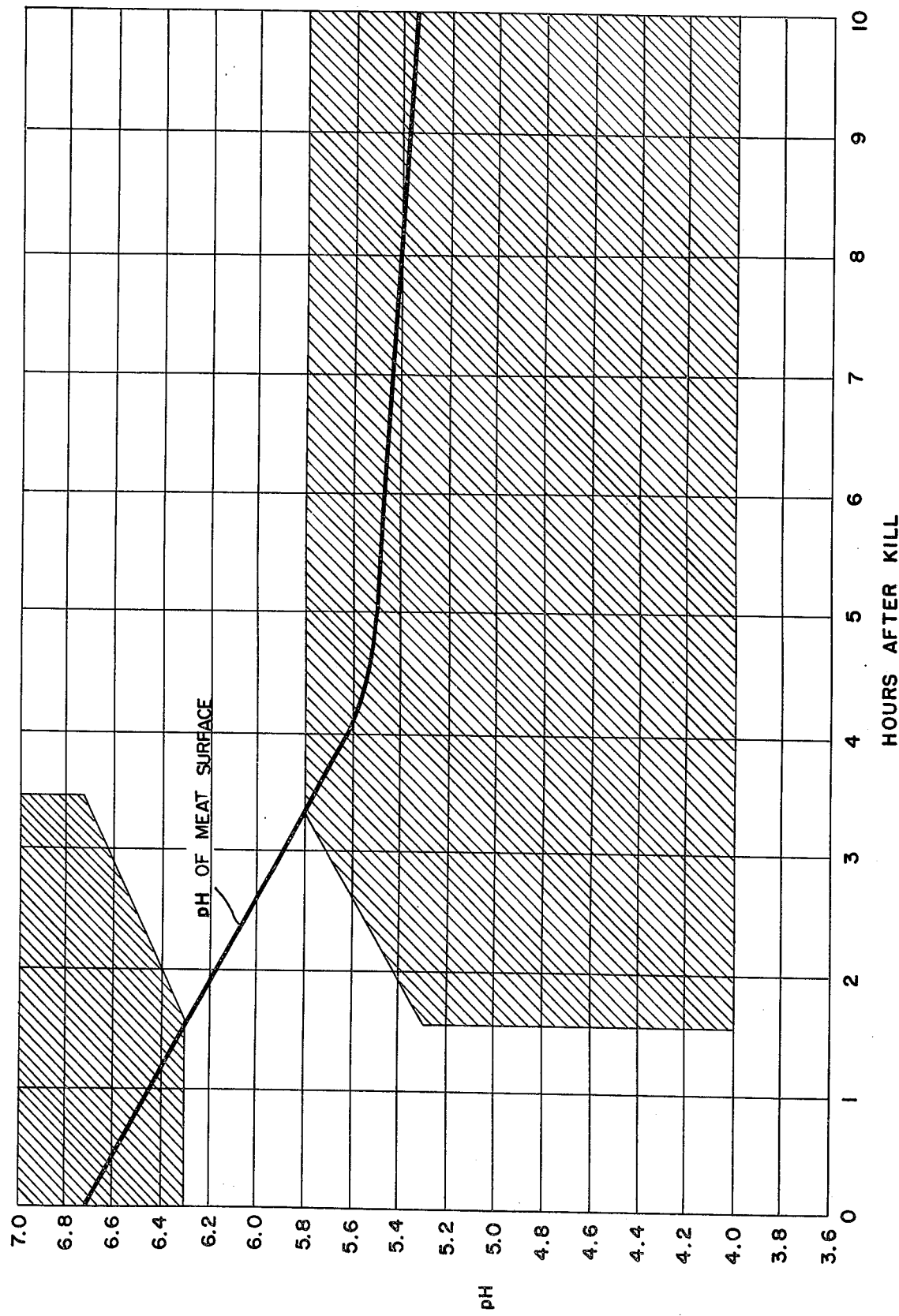

3,958,020

BACTERICIDAL WASH FOR MEAT

SUMMARY OF THE INVENTION

This invention relates to the treatment of edible meat and particularly the meat of cattle, swine, or sheep, including both muscle and organ tissue, to enhance its keeping qualities with respect to bacterial decomposition and discoloration and to inhibit the growth of salmonella organisms.

As is well known, fresh meat products are susceptible to spoilage on storage. In order to keep fresh meat products from rapid spoilage, it is customary to keep them refrigerated so that the rate of bacterial growth is slowed.

It is known that the level of bacterial growth is a function of the initial bacterial level as well as of its rate of growth. However, attempts to reduce the bacterial count on meat surfaces have met with only limited success.

The spraying of meat carcasses in a chilling chamber with water containing from 50 to 200 p.p.m. of introduced chlorine gas to reduce shrinkage during refrigeration has been suggested in U.S. Pat. No. 3,745,026, issued to Ralph R. Hansen and Gerhard M. Reiner on July 10, 1973. The Hansen et al. patent also discloses that such spraying with an aqueous chlorine solution reduced the bacterial count on the carcasses and thereby reduces spoilage and mold contamination.

United States Patent No. 3,819,329, issued to Erwin A. Kaestner and John Spink on June 25, 1974, relates to a method of disinfecting bacterial laden surfaces, including meat surfaces, by spraying onto such surfaces a solution of hypochlorous acid at a pH between 6 and 7, which solution is produced by electrolysis of an aqueous sodium chloride solution adjusted to the same pH range.

There are a number of microorganisms whose growth creates decay in meat and produces unpleasant odors and discoloration. There are also some microorganisms whose growth on meat produces serious illness in persons who ingest the meat. Among the latter microorganisms, the salmonella organism is one of the most common.

The salmonella is susceptible to the bactericidal action of hypochlorous acid; and most salmonella, along with most other microorganisms, will be killed by the application of hypochlorous acid to the external surfaces of a piece of meat. Thereafter, however, the salmonella may proliferate, given the substantial absence of competing microorganisms, and where conditions prevail which are favorable for its growth, and particularly pH levels between 5.8 and 6.3.

In accordance with the present invention an aqueous hypochlorous acid solution is used to wash the exposed surface of meat and the pH of the solution is controlled to provide a pH on the surface of the meat which is either above or below the pH range most favorable to the growth of the salmonella organism.

Specifically, this invention provides a method of preserving the meat of a slaughtered animal from bacterial decomposition and discoloration and from salmonella infestation which comprises subjecting the exposed surfaces of said meat to washing with an aqueous hypochlorous acid solution corresponding to an available chlorine content from about 50 to about 200 parts per million being at a pH related to the elapsed time of said wash after the slaughter of said animal within the range of one of the shaded areas in the Figure for elapsed times up to ten hours and within the range of 4.0 to 5.8 for elapsed times in excess of ten hours.

It is known that the salmonella organism grows best under pH conditions in the range of 5.8 to 6.3. It is also known that the pH of the surfaces of meat from slaughtered animals becomes lower with the passage of time. For beef, for example the pH at the time of slaughter is about 6.75 and drops in about 6 hours (at 37°F.) to a pH of about 5.5. The pH of pork follows a similar pattern at slightly lower levels.

When a meat surface is wetted with a liquid having a pH higher than that of the meat surface before such wetting, the surface will, of course, become more alkaline. Similarly, wetting a meat surface with a liquid of lower pH will make it more acid. The degree to which the pH of a meat surface is affected by such wetting depends on the amount of the wetting liquid which remains on the surface, and specifically, on the nature of the surface, the conditions for drainage and drying, and the time elapsed after application of the wetting liquid.

When the pH of freshly slaughtered meat drops with the passage of time, as described above, its pH passes through the range of susceptibility to salmonella proliferation (6.3 to 5.8 -hereinafter referred to as "the deleterious range") within a relatively short time, too short to result in salmonella growth to a harmful level. At 37°F., for example, the pH of both beef and pork will enter this range from the alkaline side and leave the range toward the acid side within a period of about 2 hours.

The application of a wetting liquid to a meat surface can extend the period during which a pH in the deleterious range prevails if the liquid is at a pH which is inappropriate for the time that has elapsed since the slaughter of the meat animal. Shortly after the kill, for example, while the meat is naturally at a pH in excess of 6.3, the application of a wash liquid at a pH lower (more acid) than 6.3 will accelerate the lowering of the pH of the meat surface into the deleterious range and thereby prolong the period that it remains in that range. Similarly, the application of a wash liquid higher in pH than 5.8 (more alkaline) after the pH at the meat surface has dropped to about 5.8, or lower, will extend the time that the pH remains in the deleterious range. By correlating the pH of the hypochlorous acid wash to the time elapsed since slaughter, the method of this invention avoids lengthening, and preferably shortens, the time that a meat surface remains in the deleterious pH range.

BRIEF DESCRIPTION OF THE DRAWING

The single FIGURE is a graphical representation of the relationship of the pH of the hypochlorous acid used in accordance with this invention to the time that it is applied to the meat surfaces in terms of hours after slaughter of the meat animal. The FIGURE also shows the pH drop on a meat surface with the passage of time after slaughter. The curve in the FIGURE represents an approximation of the pH drop on a meat surface at 37°C. For beef, an actual curve would generally run somewhat higher (more alkaline); and for pork an actual curve would generally run somewhat lower (more acid).

DETAILED DESCRIPTION

As shown in the FIGURE, a hypochlorous acid solution applied to a meat surface at any time up to about 1-⅔ hours after slaughter should be at a pH between 6.3 and 7.0. A hypochlorous acid solution applied to a meat surface at any time after about 3-⅓ hours after slaughter should be at a pH between 4.0 and 5.8. In the period between about 1-⅔ and about 3-⅓ hours, the hypochlorous acid should either be alkaline enough to keep the meat surface at a pH above 6.3 or acid enough to bring the meat surface more quickly down to a pH below 5.8.

The hypochlorous acid solutions used in accordance with this invention are made by the electrolysis of aqueous sodium chloride solutions with pH adjustment either before or after electrolysis.

Effective control of bacterial growth by hypochlorous acid-containing solutions requires control of the content of available chlorine of the solution. An insufficiency of available chlorine in water used to wash or spray edible meat is ineffective for the purpose, and, conversely, chlorine contents in excess of 200 parts per million are not permitted for such purposes under present United States Department of Agriculture Regulations.

It is difficult to maintain close control of the amount of chlorine gas introduced into water because of the inherent difficulties in accurate metering through an orifice of a liquid undergoing gasification and because the narrow gas passages in the control valves may be altered by the presence or absence of dirt or rust particles therein.

In addition, chlorine gas is a dangerous material to handle, requiring stringent safety measures for transportation, storage and use.

In accordance with a preferred aspect of the present invention the hypochlorous acid which is applied to the meat surfaces for its bactericidal action is prepared in situ by the electrolysis of aqueous sodium chloride. Methods and equipment for hypochlorous acid production by the electrolysis of aqueous sodium chloride are known to those skilled in the art. One suitable system is described in the aforementioned Kaester et al. U.S. Pat. No. 3,819,329. Another suitable apparatus is described in the May 1974 issue of CHEMTECH (page 263 and outside cover).

The hypochlorous acid solution is brought to the desired pH level by the addition of a suitable amount of a non-toxic acid to the aqueous sodium chloride solution either before or after the electrolysis of the solution. Acetic acid is the preferred acid. Other suitable acids include phosphoric acid, hydrochloric acid, tartaric acid and citric acid.

The application of the hypochlorous acid solution to the meat surfaces in accordance with this invention can be carried out at one or more of several stages during the processing of the meat.

In a typical processing of slaughtered cattle for the production of beef for the retail market, the cattle carcasses are skinned and halved on the kill floor while they are substantially at the body temperature of the cattle. The carcass halves are then wrapped in wet, salt-impregnated cloth shrouds and placed in a chill room, the shrouds serving to shape, smooth and whiten the external fat on the meat while the chilling takes place and hardens the fat in the desired contour. The chilling is continued for about 24 hours with the shrouds usually being removed after about 12 to 14 hours in the chill room.

After the carcass halves are removed from the chill room, they are cut into smaller pieces, either in the packing house, at distribution centers, or after being shipped to the retail market, cutting at the market frequently being followed by immediate wrapping of the meat into packages for sale.

In accordance with one aspect of this invention, the hypochlorous acid wash liquid (at a suitable pH level) is applied to the carcasses meat surfaces on the kill floor before the carcasses are shrouded and before they are placed in the chill room. At this stage, the fat on the carcass is soft and all external surfaces are exposed, resulting in effective kill of the surface bacteria, particularly of the mesophile bacteria, which flourish in warm temperatures.

In accordance with another aspect of this invention the hypochlorous wash liquid (at a pH between 5.8 and 6.3) is applied to the carcass meat surfaces after the meat is removed from the chill room and before any cutting thereof. At this stage, the meat surfaces may have a higher count of psychrophile bacteria, which flourish at cold temperatures, than of mesophile bacteria. The hardening of the fat at this stage tends to make it more difficult for the wash liquid to contact all portions of the meat surfaces and, it is preferred at this stage to direct the wash liquid at the surfaces in jets of high velocity.

When meat is cut in the packing house at distribution centers, or in the retail market, bacteria on the outer surfaces of the meat are picked up by the cutting blades or saws and carried to the freshly cut surfaces, which would otherwise be almost sterile. Bacteria thus transferred start to multiply on the freshly cut surfaces and contribute to the spoilage and discoloration of the meat. The effective bactericidal wash of this invention sharply reduces the bacterial count on the outer surfaces of the meat at the time of the cutting and thus sharply reduces the transfer of bacteria to the freshly cut surfaces. For this purposes, the bactericidal wash is at a pH between 4.0 and 5.8.

It is also desirable to apply the hypochlorous acid wash of this invention to meat pieces reduced to primal cuts or sub-primal cuts, or cut to size for institutional or retail trade. When meat is wrapped for display in a refrigerated display case, it frequently exudes fluid or blood, which accumulates as a pool within the package. Such a pool of liquid acts as a transfer medium and as a culture medium for bacteria and thus brings about spoilage of the meat much more rapidly than would occur in unpackaged meat where bacterial growth is restricted to surface spots. The method of this invention reduces the bacterial count on the surfaces of the freshly cut and packaged meat and permits longer storage in display cases without spoilage and without the danger of salmonella proliferation.

The invention has been described with respect to its use on beef and pork but it is to be understood that it is applicable to other forms of meat as well, including, but not limited to meat from sheep, goats, game animals, fowl and fish. It is also to be understood that the invention is applicable to meat derived from organ tissue as well as meat derived from muscle tissue.

In a preferred embodiment, the hypochlorous wash liquid may contain a wetting agent, such as a quaternary ammonium salt so that improved wetting of the meat surfaces with the liquid is obtained.

Other embodiments and variations of this invention will be apparent to those skilled in the art.

I claim:

1. The method of preserving the meat of a slaughtered animal selected from the group consisting of beef, sheep, goats, swine, game animals, and fowl from bacterial decomposition and discoloration and from salmonella infestation which comprises subjecting the exposed surfaces of said meat to washing with an aqueous hypochlorous acid solution corresponding to an available chlorine content from about 50 to about 200 parts per million of said solution being at a pH related to the elapsed time of said wash after the slaughter of said animal within the range of the lower shaded area in the FIGURE for elapsed times of one and two thirds hour up to ten hours and within the range of 4.0 to 5.8 for elapsed times in excess of 10 hours.

2. The method of claim 1 wherein said meat is washed more than three hours after slaughter and said aqueous hypochlorous acid solution is applied at a pH between 4.0 and 5.8.

3. The method of claim 1 wherein said meat is washed prior to any chilling thereof and while said flesh is unwrapped.

4. The method of claim 1 wherein said carcass flesh is washed with a high velocity jet of said solution while said meat is unwrapped.

5. The method of claim 1 wherein said washing is achieved by directing a high velocity jet of said solution against said exposed surfaces.

6. The method of claim 1 wherein said solution contains a wetting agent.

7. The method of claim 6 wherein said wetting agent comprises a quaternary ammonium salt.

8. The method of claim 1 wherein said solution contains a non-toxic acid.

9. The method of claim 8 wherein said acid is acetic acid.

10. The method of claim 8 wherein said acid is phosphoric acid.

11. The method of claim 8 wherein said acid is tartaric acid.

12. The method of claim 8 wherein said acid is hydrochloric acid.

13. The method of claim 8 wherein said acid is citric acid.

14. The method of claim 1 wherein said meat is in the form of pieces no larger than primal cuts.

15. The method of claim 1 wherein said meat is derived from a beef animal.

16. The method of claim 15 wherein said meat is cut to size for retail trade and is wrapped for display after said washing step.

17. The method of claim 1 wherein said meat is derived from swine.

18. The method of claim 1 wherein said meat is derived from sheep.

* * * * *